Sept. 15, 1931.  J. H. F. CASSAN  1,823,784
METHOD AND APPARATUS FOR TREATING GASES
Filed Feb. 20, 1930
Fig. 1
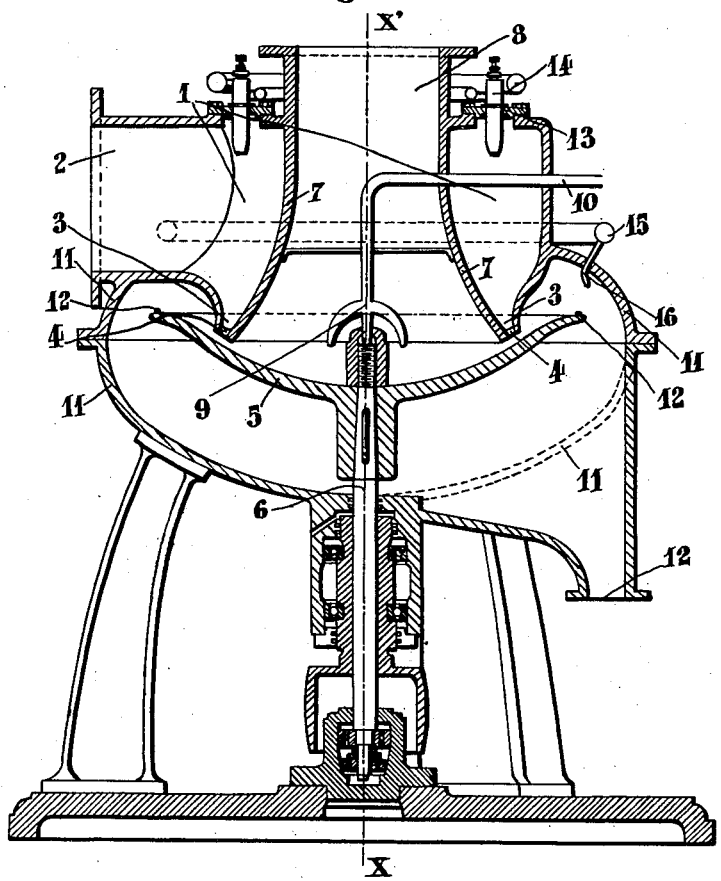
Fig. 3
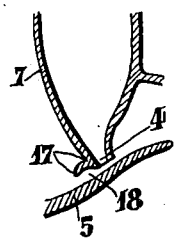
Fig. 4
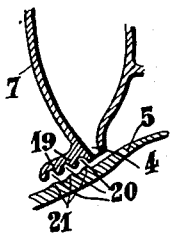
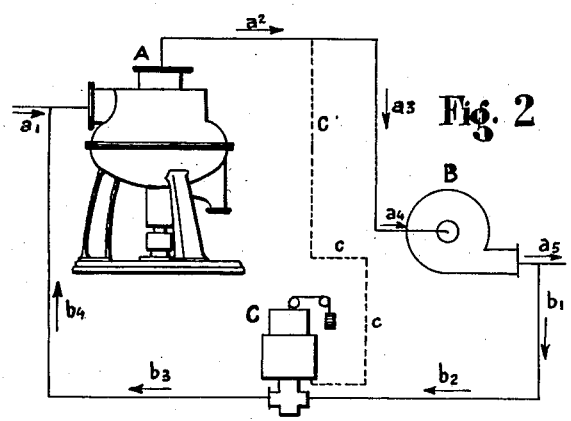
Fig. 2
Inventor
Jean H. F. Cassan
by Wilkinson & Mawhinney
Attorneys.

Patented Sept. 15, 1931

1,823,784

UNITED STATES PATENT OFFICE

JEAN HENRI FRANCOIS CASSAN, OF PARIS, FRANCE, ASSIGNOR TO COMPAGNIE GENERALE DE CONSTRUCTION DE FOURS, OF MONTROUGE, SEINE, FRANCE, A JOINT STOCK COMPANY OF FRANCE

METHOD AND APPARATUS FOR TREATING GASES

Application filed February 20, 1930, Serial No. 430,028, and in France March 2, 1929.

The object of treating industrial gases is either to purify them physically or chemically, or to extract from them certain constituents which it is advantageous to recover. There are no universal apparatus in existence at the moment which enable all the stages of the treatment to be carried out; on the contrary, each apparatus is confined within comparatively narrow limits to one or more restricted applications. The present invention has for its object to fill this gap; its aim is likewise to facilitate certain operations and to render them more efficient or more economical. An important application consists in physically purifying gases of gas producers or the like with a small expenditure of energy.

The apparatus for treating industrial gases may be brought under seven principal groups.

1. Expansion apparatus with change of direction, with or without liquid pulverization, such as the scrubbers which are unprovided with filtering material, the cooling cylinders which precede the disintegrators, the cyclones and, generally speaking, chambers with or without changes of direction.

2. Apparatus based on wall action; tubular or ring condensers, worm tubes etc.

3. Filtering apparatus: coke or ring packed towers termed "scrubbers", filtering cases with "laming" material, saw dust etc., said filters including fabric lined handles or frames.

4. Splashing apparatus; plate towers, apparatus of the type used in gas works and comprising a water container.

5. Mechanical apparatus such as liquid injection fans, squirrel cage disintegrators, washers of the gas works' type for recovering, ammonia and benzol.

6. Impact apparatus, in the forefront of which may be placed the "Pelouze and Audoin" apparatus, the Sainte-Clair Deville apparatus etc.

7. Electrical precipitating apparatus.

The apparatus forming the object of the present invention comes within the 6th category.

The principle of impact apparatus is known: The crude gas to be treated escapes at a certain velocity through an orifice facing which and at a comparatively small distance therefrom, is located an impact surface. As the gaseous molecules move forward, the solid or liquid particles are projected against said surface by inertia effect; under certain conditions, for instance sufficient speed, or adherence due to a preexisting film or resulting from prior condensations, the liquid vesicles or the dust are retained by the impact surfaces; under certain conditions also the deposits thus formed are removed naturally by drainage or artificially by mechanical means. At the present time, impact apparatus are only used for physical cleaning: However, in principle there is nothing to prevent the surface from being covered over by a film of solvent capable of retaining certain constituents (ammonia or benzol for example). However, the difficulties of a practical nature are sufficiently great to prevent an application from being carried out on an industrial scale.

It should be pointed out that in the impact apparatus now used, the treated gas flows for at least a certain length of time parallel to the direction of circulation of the condensed products; this unmethodical circulation is the cause of a decrease in efficiency of said apparatus.

The apparatus which is the object of the present invention, distinguishes from existing impact apparatus in that:

1. The liquid film overlying the impact surface is rendered imperforable to the gaseous jet under predetermined conditions;

2. The cleaning of the impact surface, in the case of the purification, and the circulation of the solvent, in the case of any given treatment, are simplified to the greatest possible extent.

3. The apparatus lends itself just as well to physical or chemical purification as to any given treatment;

4. The gas, in the course of treatment, flows in the reverse direction to that of either the condensation products or the solvent used in the treatment. The apparatus in question is characterized moreover by various arrangements which will be presently described.

The invention described is based on a certain number of physical phenomena known per se, which require special mention in view of the manner in which they are applied:

A. When a vessel containing a liquid rotates rapidly about a vertical axis, it is observed that the free surface of the liquid dips and assumes the form of a paraboloid of revolution the axis of which coincides with the axis of rotation. Each liquid molecule is then subjected to the resultant of two forces: (a) A gravity force, (b) the axifugal force which is a function of the speed of rotation; the result is that the density of the liquid is so to speak artificially increased to whatever extent desired by varying the speed of rotation. When the velocity is sufficiently high, and if the vessel is suitably designed, there can be obtained a liquid film as thin as desired, the apparent density of which is as high as is required for the application contemplated.

B. If in a flat-bottom basin, a certain quantity of liquid be placed so as to form a shallow sheet and if above this sheet, a jet of gas be blown normally thereto by means of a nozzle, it is recognized that a certain blast velocity, the surface of the liquid dips and the thickness of the sheet diminishes in front of the nozzle; when the speed is sufficiently high, the sheet is, so to speak, perforated; the liquid no longer even wets the bottom of the basin. It is thus easy to understand why an ordinry impact apparatus cannot be used readily for a treatment in which a liquid is utilized; in order that the contact between all the gaseous molecules and the liquid shall be sufficient, the velocity of the jet must be high enough: it may then come about that the liquid is expelled by the velocity of the gas which it should treat.

C. If the experiment described in the preceding paragraph be repeated and if, other things being equal, a heavier or more viscous liquid be substituted for the light and mobile liquid, it is seen that it is far harder for the force of the gaseous jet to pierce the sheet.

The invention described synthesizes these phenomena in the following manner:

An impact surface is disposed in such wise that when rapidly rotated, it can be covered over with a thin and practically imperforable liquid film. Opposite said surface, a plurality of nozzles squirt the raw gas in as many jets as is necessary to obtain an efficient contact.

If the treatment contemplated is one of simple physical purification, the sheet retains the liquid vesicles and dust which soil the gas; moreover this sheet is renewed indefinitely by a continuous circulation. In this application, it may be unnecessary to feed the liquid sheet artificially, for example if the vesicles to be condensed give rise to the formation of a suitable film; in this case, the first portions condensed retain the following ones and the operation is self-feeding, while the condensation products are removed as they are formed.

If the treatment contemplated is washing (for example oil washing to extract the benzol from the gas of coal distillation), the liquid sheet comes into contact with all the gaseous molecules which may be moving at high speed, without any danger of the film being punctured.

When a continuous feed is required, the liquid discharge may be reduced to the limit, while maintaining a continuous film, so that in the case of a material of appreciable value (oil or tar for example), the operation is as economical as possible.

An apparatus for carrying these features into effect is described hereinafter with reference to the accompanying drawings wherein:

Fig. 1 illustrates a vertical section of the apparatus in a plane through the axis.

Fig. 2 illustrates the mounting of the apparatus with a return regulator.

Figs. 3 and 4 illustrate in section two forms of a gas orifice in detail.

The apparatus comprises a vessel in the form of a hollow torus 1, which receives the crude gas through a pipe 2; at the lower portion of said torus a plurality of appendages 3 form as many nozzles through whose calibrated orifices 4, 4 the gas to be purified passes off.

The axes of these nozzles lie on a cone of revolution the apex of which lies on the axis X' X; the orifices themselves in which the nozzles terminate are cut out on a surface of revolution about the axis X' X normal to the generatrices of the cone.

Facing these orifices and perpendicular to the cone determined by their axis, is located the impact surface formed by a metallic cup 5 which is constituted by a solid of revolution having X' X as its vertical axis. Said cup is secured to a shaft 6 which rotates it through the medium of any suitable transmission; pulley, gearing, direct coupling etc.

The meridian of the surface of revolution may be formed with a series of variable curves; in the limit, if the radius of curvature becomes infinite, the cup becomes a plane.

The throat surface 7 of the torus 1 forms a central pipe 8 through which the treated gas has egress; it will be observed that the liquid sheet overlying the impact surface travels from the centre of the cup towards the rim, whereas the gas issuing from the orifices 4 travels in the reverse direction to pass out finally through the pipe 8; methodical cleaning thereby ensues.

The liquid adapted to form the treating sheet on the cup may be poured out in the vicinity of the centre by a plurality of nozzles 9 fed by the pipe 10.

The rotating impact surface 5 and all the lower portion of the apparatus are enclosed in a fluid-tight casing 11 which prevents the gas from escaping and collects the splashes of liquid and the condensed mud or liquid which has served for the treatment. The cup is flared at its edge which ends in a plane surface so that the liquid soiled by the condensates or loaded with dissolved substances is projected outwardly with maximum force. The condensates collect in the casing 11 and drain away through the pipe 12 which delivers them to the outside.

At the upper part of the torus 1 are formed inspection and cleaning plugs 13. Here likewise are placed injectors or atomizers 14, enabling steam or hot or cold water, or any suitable liquid to be injected into the torus; the purpose of such injections is: (1) To clean the internal surface of the torus 1 and of the orifice 4 to avoid obstructions; (2) To heat or cool, or humidify the crude gas before its treatment. (3) To pulverize a suitable liquid or solvent when it is desired to use the apparatus either for certain physical or for certain chemical treatments.

To put it briefly, the arrangements adopted are such that it is possible:

a. To bring the crude gas to a sta e of temperature and humidification suitable to facilitate its treatment;

b. To load it with a liquid mist reacting physically or chemically;

c. To condense the dust or liquid vesicles by impact and wiredrawing effect.

d. To wash the gas or to catch the dust and vesicles by the action of a liquid sheet.

The removal of the condensates may cause deposits to be formed on the internal surface of the casing 11, which adhere more or less thereto and which may require to be forcibly removed if they do not pass off of themselves; to this end, there has been provided a pipe 15 surrounding the apparatus and to which are secured a certain number of nozzles 16 distributed over the whole periphery. These nozzles can thus discharge either steam, or hot or cold water, or any other fluid capable of detaching the deposits formed, either by fusion, dissolution, or direct action.

It is obvious that the forms, details and dimensions of the various parts of the apparatus may vary without affecting its principle.

The principle of the invention is in no wise modified by dry operation, that is to say by the absence of pulverization in the torus 1 and by eliminating the drainage of the liquid sheet; this will be the case in particular when the gas is laden with vesicles producing a liquid which is both sufficiently fluid and adherent to the impact surface to render washing useless.

Such will likewise be the case when a sufficiently rapid gyratory motion is imparted to the gas for the solid particles to be expelled under the effect of the axifugal force, even without having made contact with the cup, while the gas purified of the dust with which it was laden flows towards the central pipe.

For the same reasons, the apparatus may be used operating dry in the usual manner, with the possibility of admitting from time to time a liquid or steam either through the orifices 9, or through the atomizers or injectors 14, the effect of such periodical injections being for example to clean out the apparatus.

The use of the apparatus raises the following important point:

The speed of the gaseous jet at the calibrated orifices 4 must have a certain minimum value for efficient operation: However, too high a velocity may be attended by drawbacks, first and foremost of which is a considerable loss of energy; on the other hand, the apparatus may be called on to treat variable gaseous discharges. This may be accomplished by stopping up a certain number of orifices by means of suitable plugs. This solutiton will be adopted to create a series of apparatus having different discharges with the same mechanical parts; moreover it is easy to conceive of plugs manipulated either manually or automatically as a function of the discharge. But another solution applicable mainly to the instantaneous variations of discharge consists in causing part of the purified gas to recirculate through the apparatus through the medium of an automatic pressure regulator, similar to the well known device used for the return regulators in connection with extractors of gas works.

For the same reason, it is advisable to use gas extractor blowers of the Roots or Beale volumetric type for example.

Fig. 2 illustrates diagrammatically and by way of example, the mounting of the apparatus when a return regulator is utilized; the treating apparatus is at A; at B is placed a supercharger or extractor for creating the motive pressure drop:

The normal gas circuit is $a_1, a_2, a_3, a_4, a_5$. At C is placed the return regulator which allows a certain quantity of gas to pass along the path $b_1, b_2, b_3, b_4$. A pilot tube $c, c, c$, places the regulator in communication with the outlet pipe of the treating apparatus; the regulator is designed to maintain a constant difference of pressure between the inlet and the outlet of the apparatus; the result is that the gas velocity is constant through the nozzles whatever may be the quantity of gas to be treated per unit of time.

Finally, the apparatus described may be constructed according to several alternatives taken separately or collectively: (A.) So far it has been assumed that the cup $a$ forming the impact surface had a smooth surface opposite the gas orifices; in certain cases, said surface may be scored with furrows traced radially, or, on the contrary, concentrically or in any other way; said furrows may vary more or less both as regards their depth and width; in the limit, said furrows may approximate to the vanes of fans or centrifugal pumps. It is evident that the presence of furrows tends to secure better contact but that, in return, the motive forces required to rotate the cup about its axis then rapidly increase. The form and dimensions of the furrows to be used will be readily determined by experience; experience will likewise show what degree of preference should be given to striated surfaces over a smooth surface. (B.) The terminal surface of the nozzles may be extended in the direction of movement of the gaseous streamline, by a sort of protuberance forming a surface of revolution. Figs. 3 and 4 are examples of different embodiments.

The gas streams issuing from the orifices 4 and wiredrawn between the surface of the cup and the edges of the orifice then penetrate into the expansion chamber 18 formed by the flange 17. In this expansion chamber, eddies are created which promote the condensation of the final liquid or solid particles entrained; the gas is again wiredrawn and it finally escapes along the axis of the apparatus. Of course, this arrangement may extend more or less far towards the axis and the number of consecutive expansion chambers is not limited.

C. In conjunction with the preceding device, a cup surface having lines or undulations may be used.

Fig. 4 exemplifies such an arrangement: The extension 19 forms a certain number of expansion chambers 20, to each of which corresponds an undulation 21 of the cup.

D. A final alternative consists in replacing the series of nozzles 4 which are assumed to be separated, by a continuous and circular slot.

I claim:

1. A method of treating gases which consists in projecting a jet of gas to be treated against a body of liquid rotated at high velocity to form a film unpuncturable by said gas jet at predetermined velocities of said gas and liquid respectively, whereby the fixed or condensed products issuing from the gas upon impact with the liquid film which causes them to be dissolved or suspended in said film, are projected outwardly by centrifugal force, and in causing the treated gases to flow in the opposite direction to that of the fixed or condensed products extracted from said gases.

2. A method of treating gases which consists in projecting a jet of gas to be treated against a body of liquid rotated at high velocity to form a film unpuncturable by said gas jet at predetermined velocities of said gas and liquid respectively, whereby the fixed or condensed products issuing from the gas upon impact with the liquid film which causes them to be dissolved or suspended in said film, are projected outwardly by centrifugal force, in causing the treated gases to flow in the opposite direction to that of the fixed or condensed products extracted from said gases, and in collecting the said treated gases and fixed or condensed products separately.

3. A method of treating gases which consists in suspending a liquid mist in the gases to be treated, in imparting velocity to the gases to be treated, in directing said gases in jets against a body of liquid rotated at high velocity to form a film unpuncturable by said gas jet at predetermined velocities of said gas and liquid respectively, in wiredrawing said gaseous jets prior to their contacting with said liquid whereby the resilient eddies help said liquid in extracting the fixed or condensed products suspended in said gases, in causing the treated gases to flow in the opposite direction to that of the fixed or condensed products which are projected outwardly by centrifugal force, and in collecting said treated gases and fixed or condensed products separately.

4. In apparatus for treating gases, the combination of a hollow torus, means for delivering the gases to be treated to said torus, an impact plate containing liquid and located in spaced relation to said torus, said impact plate being bowl shaped with a flaring rim, means for rotating said plate at high speed about an axis perpendicular to its plane, said torus having nozzles formed therein through which the gases are discharged into contact with said liquid, and means for withdrawing said gases after their treatment.

5. In apparatus for treating gases, the combination of a hollow torus, means for delivering the gases to be treated to said torus, an impact plate containing liquid and located in spaced relation to said torus, said impact plate being bow shaped with a flaring rim, means for rotating said plate at high speed about an axis perpendicular to its plane, said torus having nozzles formed therein through which the gases are discharged into contact with said liquid, an extension lip integral with each nozzle and cooperating with said impact plate to form a channel through which said gases are wiredrawn, and means for withdrawing said gases after their treatment.

6. In apparatus for treating gases, the combination of a hollow torus, means for delivering the gases to be treated to said torus, an impact plate containing liquid and located in spaced relation to said torus, means for rotating said plate at high speed about an axis perpendicular to its plane, said torus having nozzles formed therein through which the gases are discharged into contact with said liquid, and a pipe disposed centrally of said torus for withdrawing said gases once treated, said gases thus flowing in the contrary direction to the impurities extracted therefrom by said liquid and projected outwardly by centrifugal force.

7. In an apparatus for treating gases, the combination of a hollow torus, means for delivering the gases to be treated to said torus, an impact plate containing liquid and located in spaced relation to said torus, said impact plate being bowl shaped with a flaring rim, means for rotating said plate at high speed about an axis perpendicular to its plane, said torus having nozzles formed therein through which the gases are discharged into contact with said liquid, an extension lip integral with each nozzle and formed with grooves disposed in spaced relation to ribs provided in said plate and forming therewith channels through which said gases are wiredrawn, and means for withdrawing said gases after their treatment.

JEAN HENRI FRANCOIS CASSAN.